3,212,866
HYDRAZINE-HYDROCARBON DISPERSION COMPOSITION
Frederic C. McCoy, Beacon, and Edwin C. Knowles, Poughkeepsie, N.Y., assignors to Texaco Inc., New York, N.Y., a corporation of Delaware
No Drawing. Filed Dec. 26, 1962, Ser. No. 247,281
22 Claims. (Cl. 44—51)

This invention relates to novel compositions comprising transparent micellar dispersions of hydrazine in hydrocarbons. More particularly, this invention is directed to hydrazine-hydrocarbon dispersion compositions wherein the hydrazine is dispersed in the form of micelles having an average particle size of less than 0.1 micron. This application is a continuation-in-part of the following applications: S.N. 39,444; 39,445 and 39,446, all filed on June 29, 1960; and S.N. 107,293 and 107,294, both filed on May 3, 1961, all of which applications are now abandoned.

Hydrazine is known for its use in many applications. Hydrazine has found application in the fields of plastics, rubber manufacture, insecticides and fungicides, textiles, explosives and dye intermediates. The hydrazine-hydrocarbon compositions of this invention consisting of transparent micellar dispersions of hydrazine in hydrocarbons constitute a substantial advance in the field of hydrazine uses since heretofore hydrocarbon-hydrazine one phase liquids were not attainable because hydrazine is soluble in hydrocarbons to an extremely limited degree. In fact it is generally accepted that hydrazine is completely insoluble in hydrocarbons. The transparent dispersion compositions of the present invention therefore open an unlimited field of new uses of hydrazine.

The transparent micellar hydrazine-hydrocarbon dispersion compositions of this invention are particularly effective as an insecticide against aphids, as a herbicide against digitaria sanguinalis and as a bactericide and fungicide. These compositions are also useful as high energy fuels.

The transparent hydrazine-hydrocarbon dispersion composition of the present invention is comprised of 99.5–30 weight percent hydrocarbon phase, 0.5–70 weight percent hydrazine phase dispersed throughout the hydrocarbon phase in the form of micelles having an average diameter of less than 0.1 micron, a hydrocarbon-soluble, hydrazine-insoluble dispersant in a concentration equivalent to about 3–70 weight percent of the hydrocarbon phase, with the hydrocarbon being present in an amount of between about 30 and 97 weight percent; and a hydrazine-soluble, hydrocarbon-insoluble dispersant in a concentration equivalent to about 10–40 weight percent of the hydrazine phase, with the hydrazine being present in an amount of between about 60 and 90 weight percent. The hydrocarbon component of the hydrocarbon phase is present in the range of between about 15 and 90 weight percent of the entire composition. The hydrazine component of the hydrazine phase is present in the range of between about 0.4 and 60 weight percent of the entire composition.

The transparent micellar hydrazine-hydrocarbon dispersion compositions of the present invention may also advantageously contain additives which impart many desirable properties to the dispersions since these additives can be incorporated without adversely affecting the stability of the transparent dispersions, for example, anti-oxidants, anti-foam agents, pour point depressants, etc.

In the transparent hydrazine-hydrocarbon dispersant compositions of the present invention, hydrazine is dispersed throughout the hydrocarbon phase in micelles having an average diameter less than 0.1 micron and preferably less than 0.05 micron. The hydrazine micelles usually have an average diameter between about 0.01 micron and 0.05 micron. Because the hydrazine is dispersed in the form of such small micelles by the action of the dispersants, the compositions of the invention are completely transparent and are indistinguishable in appearance from the hydrazine-free hydrocarbon composition.

Since as high as 50 percent hydrazine can be dispersed in the form of micelles having an average particle diameter less than 0.1 micron by the proper selection and concentration of the dispersants, compositions falling within the scope of the invention and containing up to 50 percent hydrazine are extremely useful as insecticides and herbicides.

Probably the greatest impetus to the development of the chemistry of hydrazine lies in its usefulness as a fuel for guided missiles and as a propellant fuel for rockets. It is an ideal component for rocket fuel since its complete combustion to nitrogen and water yields a mixture of products with low average molecular weight. However, up to now its use has been limited because of its high melting point. The transparent dispersion of the hydrazine and hydrocarbon provides a heretofore unattainable stable single phase transparent liquid fuel with extremely desirable high specific impulse which is storage stable and shock resistant.

The hydrocarbon component of the transparent hydrazine-hydrocarbon dispersion composition is a liquid hydrocarbon having a boiling point between 100 and 600° F. and may be aliphatic, cycloaliphatic or aromatic liquid hydrocarbons or mixtures thereof.

Normally hydrocarbon mixtures are used such as kerosene, petroleum naphtha, gasoline and jet fuels such as JP-1, JP-2, JP-3, JP-4 and RP-1. Particularly useful in high energy fuel compositions are primarily straight chain or slightly branched chain paraffin fractions which have been isolated from hydrocarbon mixtures by procedures such as solvent extraction, urea complexing and molecular sieve treatment. Udex raffinate is an example of such a fraction. In addition to mixtures, relatively pure hydrocarbons are used such as: pentane, hexane, heptane, octane, cyclopentane, cyclohexane, methylcyclopentane, ethylcyclopentane, methylcyclohexane, decalin, benzene, toluene, xylene, trimethyl benzene and methylnaphthalene.

The compositions of the present invention have been found to exhibit extremely desirable specific impulse and, as such, are effective as high energy fuels within the range herein prescribed. The hydrocarbon phase, which contains the hydrocarbon-soluble, hydrazine-insoluble dispersant, broadly constitutes 30–99.5 weight percent of the transparent hydrazine-hydrocarbon dispersion composition of the present invention. However, the preferred concentration of the hydrocarbon phase for high energy fuels falls between 40–70 percent of the total dispersion composition. The hydrocarbon-soluble, hydrazine-insoluble dispersant is introduced in the hydrocarbon phase generally in the range of between 3 to 70 percent of the hydrocarbon phase with the preferred range being from 3 to 20 weight percent. The optimum concentration of dispersant in any given case is determined by the amount of hydrazine it is desired to disperse in the composition.

The hydrazine phase, which includes the concentration of the hydrazine-soluble, hydrocarbon-insoluble dispersant, broadly constitutes 0.5 to 70 weight percent of the transparent micellar hydrazine-hydrocarbon dispersant composition. The preferred concentration of the hydrazine phase for a high energy fuel falls between 30 and 60 weight percent. The hydrazine-soluble, hydrocarbon-insoluble dispersant is present in the hydrazine phase in a concentration of 10–40 weight percent of the hydrazine phase with the preferred range particularly for a high energy fuel being 15–25 percent. Both the hydrocarbon-soluble and the hydrazine-soluble dispersants can be anionic, cationic or nonionic. The only limitations are that the dispersants be sufficiently soluble in their respective phases, and that they be stable in the presence of hydrazine.

For the high energy fuel use it is desirable that the dispersants used have as high heats of combustion as possible, and that they have no ash content. For other applications the choice of dispersants may be much broader and the preferred materials in any particular case will depend on such considerations as performance, cost, toxicity, etc.

Effective hydrocarbon-soluble, hydrazine-insoluble dispersants are the alkylene oxide adducts of alcohols, alkylphenols, acids, amides and amines. These alkylene oxide adducts of alcohols, alkylphenols, acids, amides and amines are represented by the following general formula:

$$X(R'O)_nH$$

wherein X is a $C_6$ to $C_{24}$ residue of an aliphatic alcohol, an aliphatic carboxylic acid, an aliphatic hydrocarbyl amide, an aliphatic hydrocarbyl amine or a $C_{10}$ to $C_{24}$ residue of an alkylphenol, R' is a divalent aliphatic hydrocarbon radical containing from 2 to 4 carbon atoms and n has a value of 1 to 6.

More specifically, the alkylene oxide adducts of alcohols have the general formula:

$$RO(R'O)_nH$$

wherein R is a monovalent aliphatic hydrocarbon radical containing 6 to 24 carbon atoms, R' is a divalent aliphatic hydrocarbon radical containing from 2 to 4 carbon atoms and n has a value of 1 to 6, and preferably 1 to 4.

The alkylene oxide adducts of the alkylphenols have the general formula:

$$R''O(R'O)_nH$$

in which R'' is an alkaryl radical having from 10 to 24 carbon atoms, R' and n having the same values noted above. Examples of dispersants of this type are the reaction products of $C_9$-, $C_{12}$-, and $C_{15}$-alkylphenols with 1 to 6 mols of ethylene oxide or propylene oxide. More specific examples are a $C_{12}$ alkyl phenol-ethylene oxide adduct containing an average of 3 ethylene oxide units per molecule, a nonyl phenol-ethylene oxide containing an average of 4 ethylene oxide units per molecule, and a $C_{12}$ alkyl phenol-propylene oxide adduct containing an average of 3 propylene oxide units per molecule.

Hydrocarbon-soluble, hydrazine-insoluble alkylene oxide adducts of amines have the general formula:

$$\underset{\underset{R}{|}}{H}N(R'O)_nH$$

wherein R is a monovalent aliphatic hydrocarbon radical of from 6–24 carbon atoms and preferably 12–20 carbon atoms, R' is a divalent aliphatic hydrocarbon radical of from 2–4 carbon atoms, and n has a value of 1–6 and preferably 1–4. Examples of dispersants of this type are a tertiary $C_{13}$ alkyl primary amine plus 1 mol ethylene oxide, a tertiary $C_{18}$ alkyl primary amine plus 2 mols of propylene oxide. Secondary amines are also useful as dispersants and have the general formula:

$$\underset{\underset{R}{|}}{R''}N(R'O)_nH$$

wherein R is a monovalent aliphatic hydrocarbon radical of from 6–24 carbon atoms and preferably 12–20 carbon atoms, R' is a divalent aliphatic hydrocarbon radical of from 2–4 carbon atoms, R'' is hydrogen or an alkyl radical and n has a value 1–6 and preferably 1–4. An example of dispersants of this type are dihexylamine plus 1 mol of ethylene oxide. The alkylene oxide adducts of the amines are superior for high energy fuels because of their higher heats of combustion. Particularly preferred is the reaction product of a $C_{13}$ alkylamine and 1 mol of ethylene oxide.

The general formulae for the acid-alkylene oxide adducts and the amide-alkylene oxide adducts are respectively represented as follows:

$$R-\underset{\underset{}{}}{\overset{\overset{O}{\|}}{C}}-O(R'O)_nH$$

and $$R-\underset{\underset{}{}}{\overset{\overset{O}{\|}}{C}}-\underset{\underset{}{}}{\overset{\overset{H}{|}}{N}}(R'O)_nH$$

wherein R is a monovalent aliphatic hydrocarbon radical of from 6–24 carbon atoms and preferably 12–20 carbon atoms, R' is a divalent aliphatic hydrocarbon radical of from 2–4 carbon atoms and n has a value of 1–6 and preferably 1–2.

The remaining essential component required for the formulation of the transparent hydrazine-hydrocarbon micellar dispersion composition is a hydrazine-soluble, hydrocarbon-insoluble dispersant. Effective hydrazine-soluble, hydrocarbon-insoluble dispersants include the hydrazine salts of the following acids:

(a) Aliphatic carboxylic acids of at least 4 carbon atoms to 30 carbon atoms,
(b) Alkylated aromatic acids in which the alkyl group has 10 to 30 carbon atoms,
(c) Alkylated aromatic sulfonic acids in which the alkyl group has 10 to 30 carbon atoms,
(d) Petroleum sulfonic acids of 250 to 500 molecular weight, and the quaternary ammonium salts.

Preferred hydrazine-soluble, hydrocarbon-insoluble dispersants within the foregoing classes are the liquid-unsaturated fatty acids having 16 to 20 carbon atoms, liquid highly branched-chain fatty acids having 16 to 20 carbon atoms, the alkylated aromatic and alkylated aromatic sulfonic acids in which the alkyl group has from 10 to 30 carbon atoms and the petroleum sulfonic acids of 250 to 500 molecular weight. Specific dispersants within the foregoing classes include the hydrazine salts of the following acids, namely, caprylic acid, 2-ethylhexanoic acid, high neut. number oxidates prepared by the oxidation of high molecular weight petroleum fractions such as distillate lubricating oil and paraffin wax, oleic acid, linoleic acid, a highly branched-chain saturated $C_{18}$ liquid fatty acid commercially avialable as Emery 3101–R acid, dinonylsalicyclic acid, $C_{18}$ alkylated benzoic acid, $C_{20}$ alkylated benzene sulfonic acid, 450 molecular weight petroleum sulfonic acid and the quaternary ammonium salts, such as alkyl benzyl dimethyl ammonium chloride.

The transparent hydrazine-hydrocarbon dispersion composition of the present invention is prepared by placing the four components, namely, hydrazine, hydrocarbon, hydrazine-soluble, hydrocarbon-insoluble dispersant and hydrocarbon-soluble, hydrazine-insoluble dispersant, in the prescribed concentrations in a vessel and subjecting the resulting mixture to agitation. When a hydrazine salt of an aliphatic carboxylic acid is employed as the hydrazine-soluble, hydrocarbon-insoluble dispersant, the hydrazine salt is formed in situ by the reaction of an aliphatic carboxylic acid with the hydrazine in the prescribed amounts, and, as such, is added to the other ingredients of the dispersion composition during preparation as the acid, with the salt being formed, as previously stated, in situ. The preferred procedure involves dissolving the hydrazine-soluble, hydrocarbon-insoluble dispersant in the hydrazine and the hydrocarbon-soluble, hydrazine-insoluble dispersant in the hydrocarbon, combining the resulting solutions and subjecting the resulting mixture to agitation. In the preparation, excessively high temperatures, that is, above about 160° F., are avoided since above this temperature there is a tendency for the dispersion to separate into its components. Accordingly, the preparation of the transparent hydrazine-hydrocarbon dispersion is generally effected at temperatures between 60 and 140° F.

Examples 1 to 8 demonstrate the formulation of the dispersion compositions of the present invention wherein the hydrocarbon used is a hydrocarbon fraction widely used as a jet fuel, known as JP–4. In these examples with the exception of Examples 1 and 7 an adduct of a mixture of tertiary $C_{12}$–$C_{15}$ alkyl primary amine is used as the hydrocarbon-soluble, hydrazine-insoluble dispersant. Examples 1 and 7 utilize a nonylphenol-4-mols-ethylene oxide adduct as the hydrocarbon-soluble, hydrazine-insoluble dispersant. In the hydrazine phase Examples 1 and 7 utilize the salt formed in situ by the reaction of the hydrazine and caprylic acid as the hydrazine-soluble, hydrocarbon-insoluble dispersant and Examples 2–6 and 8 utilize the salt formed in situ by the reaction of the hydrazine and 2-ethylhexanoic acid. The composition and appearance properties of these examples are shown in Table I.

The transparent hydrazine-hydrocarbon micellar dispersions utilizing Udex raffinate which is a low aromatic content naphtha fraction obtained as a raffinate in glycol extraction of a catalytic reformate as the hydrocarbon are shown in Examples 9–12. The hydrocarbon-soluble, hydrazine-insoluble dispersant utilized in Examples 9 and 10 was tertiary $C_{12}$–$C_{15}$ mixture alkyl primary amine plus 1 mol ethylene oxide, in Examples 11 and 12 the dispensant was nonylphenol-4-mol-ethylene oxide adduct. In the hydrazine phase, 2-ethylhexanoic acid is used to form the hydrazine salt, the hydrazine-soluble, hydrocarbon-insoluble dispersant in Examples 9 and 11. In Example 10 naphthenic acid is used to form the dispersant salt and in Example 14 caprylic acid is used to form the in situ salt. The composition and appearance properties of Examples 9–12 are shown in Table II.

TABLE II

| | Weight percent | | | |
|---|---|---|---|---|
| | Ex. 9 | Ex. 10 | Ex. 11 | Ex. 12 |
| Composition— | | | | |
| Hydrocarbon phase: | | | | |
| Udex raffinate | 31.7 | 32.8 | 31.2 | 31.3 |
| Nonyl phenol-4-mol ethylene oxide | | | 31.2 | 25.0 |
| Tertiry $C_{12}$–$C_{15}$ mixture alkyl primary amine plus 1 mol ethylene oxide | 23.9 | 16.4 | | |
| Hydrazine phase: | | | | |
| Hydrazine | 31.7 | 32.8 | 31.2 | 32.5 |
| Caprylic acid | | | | 11.2 |
| 2 ethylhexanoic acid | 12.7 | | 6.4 | |
| Naphthenic acid | | 18.0 | | |
| Storage stability: | | | | |
| After 3 mos. at room temperature | Clear | Clear | Clear | Clear |
| After 1 mo. at 150° F | Clear | Clear | Clear | Clear |
| Resistance to freezing: Appearance after freezing solid and thawing | Clear | Clear | Clear | Clear |

Example 13 is illustrative of a cycloaliphatic hydrocarbon and Example 14 is illustrative of an aromatic hydrocarbon used in the transparent hydrazine-hydrocarbon micellar dispersions of the present invention. The composition and properties of Examples 13 and 14 are shown in Table III.

TABLE I

| | Weight percent | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| Composition— | | | | | | | | |
| Hydrocarbon phase: | | | | | | | | |
| JP–4 | 31.0 | 31.2 | 45.5 | 20.0 | 32.25 | 20.0 | 30.3 | 20.7 |
| Nonyl phenol-4-mol ethylene oxide adduct | 26.7 | | | | | | 27.3 | |
| Tertiry $C_{12}$–$C_{15}$ mixture alkyl primary amine plus 1 mol ethylene oxide adduct | | 25.1 | 22.7 | 24.0 | 22.6 | 24.0 | | |
| Hydrazine phase: | | | | | | | | |
| Hydrazine | 31.0 | 31.2 | 22.7 | 40.0 | 32.25 | 40.0 | 30.3 | 41.3 |
| Caprylic acid | 11.3 | | | | | | 12.1 | |
| 2-ethylhexanoic acid | | 12.5 | 9.1 | 16.0 | 12.9 | 16.0 | | 16.6 |
| Properties: Appearance | Transparent | Transparent | Transparent | Transparent | Transparent | Transparent | Transparent | Transparent |
| Storage stability: | | | | | | | | |
| After 3 months at room temperature | Clear | Clear | Clear | Clear | Clear | Clear | Clear | Clear |
| After 1 month at 150° F | Clear | Clear | Clear | Clear | Clear | Clear | Clear | Clear |
| Resistance to freezing: Appearance after freezing solid and thawing | Clear | Clear | Clear | Clear | Clear | Clear | Clear | Clear |

TABLE III

| | Weight percent | |
|---|---|---|
| | Example 13 | Example 14 |
| Composition— | | |
| Hydrocarbon phase: | | |
| Methyl cyclohexane | 34.8 | |
| Toluene | | 34.8 |
| Tertiary $C_{12}$–$C_{15}$ mixture alkyl primary amine plus 1 mol ethylene oxide | 18.0 | 15.7 |
| Hydrazine phase: | | |
| Hydrazine | 33.7 | 36.0 |
| 2-ethylhexanoic acid | 13.5 | 13.5 |
| Properties: Appearance | Transparent | Transparent |
| Storage stability: After 3 mos. at room temperature | Clear | Clear |
| Resistance to freezing: Appearance after freezing solid and thawing | Clear | Clear |

Properties of the transparent hydrazine-hydrocarbon dispersion composition of the present invention are shown in Table IV following.

TABLE IV

| | Ex. 15 | Ex. 16 | Ex. 17 | Ex. 18 |
|---|---|---|---|---|
| Composition (wt. percent): | | | | |
| Udex raffinate | 50.0 | 33.5 | 21.7 | 14.6 |
| Tertiary $C_{12}$-$C_{15}$ mixture alkyl primary amine plus 1 mol ethylene oxide | 22.0 | 23.9 | 22.2 | 20.0 |
| 2-ethylhexanoic acid | 8.0 | 12.2 | 16.7 | 16.6 |
| Hydrazine | 20.0 | 30.4 | 39.4 | 48.8 |
| Properties: | | | | |
| Sp. gravity | 0.814 | 0.855 | 0.892 | 0.935 |
| Vis., kin.: | | | | |
| At 100° F. cs | 4.04 | 5.98 | 6.88 | 6.08 |
| At 77° F. cs | 5.63 | 8.57 | 10.07 | 8.73 |
| Heating value, B.t.u./lb | 15,871 | 14,622 | 12,817 | 11,472 |
| Freezing point, ° F | +10 | +18 | +12 | +12 |
| Appearance | (1) | (1) | (1) | (1) |
| Storage stability: | | | | |
| After 3 mos. at room temperature | Clear | Clear | Clear | Clear |
| After 1 mo. at 150° F | Clear | Clear | Clear | Clear |
| Resistance to freezing: Appearance after freezing solid and thawing | Clear | Clear | Clear | Clear |

[1] Transparent.

As has been previously stated the novel compositions of the present invention have been found to be effective as an insecticide in killing aphids and as a herbicide in killing digitaria sanguinalis. Compositions of Examples 1, 2 and 10 were applied, in the normal manner, and were found completely effective in killing both aphids and digitaria sanguinalis. It should be noted that lower concentrations of hydrazine about 3-10 weight percent is sufficient when the dispersions of the present invention are so utilized.

The composition of the present invention was also tested to obtain specific impulse data. Table V below indicates the effectiveness and particular usefulness of the transparent hydrazine-hydrocarbon micellar dispersion compositions of the present invention as high energy fuels from their high specific impulse. Data shown are for the composition of Example 12. Combustion chamber pressure in all cases is 1000 p.s.i.

TABLE V

| Oxidizer | Stoichiometric ratio [1] | Temp. ° K. | Density | Specific impulse (Isp) | |
|---|---|---|---|---|---|
| | | | | Shifting equilibrium | Density ×Isp |
| Liquid $C_2$ | 0.7 | 3,546 | 1.028 | 304.2 | 312.8 |
| Liquid $C_2$ | 0.8 | 3,627 | 1.036 | 305.2 | 316.3 |
| Liquid $C_2$ | 0.85 | 3,643 | 1.040 | 304.0 | 316.2 |
| $N_2O_4$ | 0.8 | 3,326 | 1.227 | 275.3 | 337.7 |
| $N_2O_4$ | 0.85 | 3,349 | 1.234 | 276.2 | 340.9 |
| $N_2O_4$ | 0.925 | 3,356 | 1.245 | 275.7 | 343.3 |

[1] Fuel to oxidizer.

NOTE.—The above oxidizers were added to the fuel for specific impulse evaluating.

It has also been found that the freezing point of the transparent hydrazine-hydrocarbon micellar dispersion may be reduced by the addition of certain freezing point depressants. The freezing point depressants that may be utilized to lower the freezing point of the micellar dispersions of the present invention are water, the $C_1$ to $C_3$ alcohols, acetonitrile, acetone, formamide and dimethyl formamide. The freezing point depressant should be present in an amount between 0.1 and 15 weight percent of the composition. Examples of these alcohols are methanol, ethanol, isopropanol and n-propanol.

Table VI following illustrates the freezing point depressing ability of the water and lower alcohols in the hydrazine-hydrocarbon dispersion composition.

TABLE VI

| | Ex. 19 | Ex. 20 | Ex. 21 | Ex. 22 | Ex. 23 | Ex. 24 | Ex. 25 |
|---|---|---|---|---|---|---|---|
| Composition (wt. percent): | | | | | | | |
| Udex raffinate | 26.0 | 33.5 | 28.5 | 32.8 | 32.8 | | |
| JP-4 | | | | | | 20.2 | 21.7 |
| t-($C_{13}$-$C_{15}$) mixture alkyl primary amine plus 1 mol ethylene oxide | 27.2 | 23.9 | 25.0 | 16.4 | 16.4 | 21.1 | 22.8 |
| 2 ethyl hexoic acid | 7.8 | 12.2 | 8.4 | | | 16.2 | 16.0 |
| Naphthenic acid | | | | 18.0 | 18.0 | | |
| Hydrazine | 26.0 | 30.4 | 28.6 | 32.8 | 30.8 | 40.5 | 39.5 |
| Water | | | | | 2.0 | 2.0 | |
| Methanol | 13.0 | | 9.5 | | | | |
| Properties: | | | | | | | |
| Appearance | Clear | Clear | Clear | Clear | Clear | Clear | Clear |
| Freezing point, ° F | −30 | +18 | −18 | +15 | −5 | −20 to −40 | +30 |
| Storage Stability: | | | | | | | |
| After 3 months at room temperature | Clear | Clear | Clear | Clear | Clear | Clear | Clear |
| After 1 month at 150° F | Clear | Clear | Clear | Clear | Clear | Clear | Clear |
| Resistance to freezing: Appearance after freezing solid and thawing | Clear | Clear | Clear | Clear | Clear | Clear | Clear |

The examples of Table VI show that the addition of 9.5 and 13.0 weight percent methanol lowered the freezing point of hydrazine-hydrocarbon dispersion from +18° F. in Example 20 to −18° and −30° F. in Examples 19 and 21 respectively. In Examples 23 and 24 the freezing point of the dispersion was lowered to −5° and −40° F. as compared to +15° and +30° F. respectively in Examples 22 and 25 after the addition of 2.0 weight percent water. It should also be noted that the freezing point as shown in Example 24 continued to be lowered after the addition of water upon storage; after one week the freezing point was −20° F. but after 12 weeks it dropped to −40° F.

It has been further discovered that the viscosity of the transparent hydrazine-hydrocarbon micellar dispersion compositions may be lowered by the addition of certain viscosity depressants. The depressants used to lower the viscosity of these compositions are $C_4$ to $C_{18}$ alcohols and preferably aliphatic alcohols of this chain length. The viscosity depressant should be present in an amount of between 5.0 and 30 weight percent of the composition. Examples of these alcohols are 2-ethyl butanol, isoamyl alcohols, secondary amyl alcohol, isomeric heptyl alcohols, 2-ethylhexanol, isooctyl alcohols and isomeric nonyl alcohols.

Table VII following illustrates the viscosity depressing ability of the $C_4$ to $C_{18}$ alcohols in the hydrazine-hydrocarbon micellar dispersion compositions.

TABLE VII

|  | Ex. 26 | Ex. 27 | Ex. 28 | Ex. 29 |
|---|---|---|---|---|
| Composition (wt. percent): |  |  |  |  |
| JP-4 |  | 30.3 |  | 29.6 |
| Udex raffinate | 33.5 |  | 32.1 |  |
| t-($C_{13}$-$C_{15}$) mixture alkyl primary amine plus 1 mol ethylene oxide | 23.9 | 3.0 | 6.1 | 25.0 |
| 2 ethylbutanol |  | 21.2 | 20.2 |  |
| 2 ethylhexoic acid | 12.2 | 15.2 | 12.5 | 14.7 |
| Hydrazine | 30.4 | 30.3 | 29.1 | 30.7 |
| Properties: |  |  |  |  |
| Appearance | Clear | Clear | Clear | Clear |
| Vis., kin.: |  |  |  |  |
| At 77° F | 8.57 | 5.10 | 4.11 | 10.76 |
| At 100° F | 5.98 | 3.78 | 3.05 | 7.35 |
| Storage Stability: |  |  |  |  |
| After 3 months at room temperature | Clear | Clear | Clear | Clear |
| After 1 month at 150° F | Clear | Clear | Clear | Clear |
| Resistance to freezing: Appearance after freezing solid and thawing | Clear | Clear | Clear | Clear |

The above data of Table VII shows the viscosity depressant properties of the additives of the present invention.

All of the Examples 1-29 were prepared as previously described and were clear, stable, transparent dispersions.

The examples of the invention presented in Tables VIII to X below are particularly directed to the improvements disclosed in applications S.N. 107,293 and S.N. 107,294 of which this application is a continuation-in-part.

TABLE VIII

|  | Ex. 30 | Ex. 31 | Ex. 32 | Ex. 33 | Ex. 34 |
|---|---|---|---|---|---|
| Composition: |  |  |  |  |  |
| Udex raffinate | 53.4 | 37.5 | 35.8 | 51.5 | 52.4 |
| Priminox R-1M [1] | 3.3 | 3.1 | 3.0 | 3.2 | 3.3 |
| Oleic acid | 10.0 | 9.4 | 10.5 | 11.2 |  |
| Stearic acid |  |  |  |  | 11.5 |
| Hydrazine | 33.3 | 50.0 | 47.7 | 32.1 | 32.8 |
| Water |  |  | 3.0 | 2.0 |  |
| Complete fuel—Hydrazine plus Udex raffinate plus surfactants: |  |  |  |  |  |
| Carbon | 55.15 | 41.07 | 40.44 | 54.37 | (a) |
| H | 14.11 | 13.66 | 13.21 | 13.83 |  |
| O | 1.42 | 1.33 | 1.45 | 1.55 |  |
| N | 29.32 | 43.94 | 41.90 | 28.26 |  |
| $H_2O$ |  |  | 3.00 | 1.99 |  |
| Gross heat of combustion, B.t.u./lb. (calc.) | 15,880 | 13,900 | 13,550 | 15,650 |  |
| Gross heat of combustion, B.t.u./lb. observed | 15,622 | 13,648 | 13,333 | 15,282 |  |
| Heat of Formation kcal./100 g | −25.6 | −10.3 | −11.1 | −25.4 |  |
| Vis., kin. at 77° F | 4.40 | 9.07 | 37.7 | 5.29 |  |
| Freezing pt | (2) | (3) | (4) | (5) |  |
| Specific gravity, 60/60 | .822 | .869 | .876 | .829 |  |

[1] Priminox R-1M is tertiary $C_{12}$ to $C_{15}$ mixture of alkyl primary amine plus 1 mol of ethylene oxide.
[2] OK at +7° F.
[3] Solid at +7° F.
[4] Clear at −10° F., solid at −15° F.
[5] Clear at −5° F., solid at −10° F.

(a) Example 34 which contained 11.5 weight percent of stearic acid, which is a straight chain saturated fatty acid, formed a completely unsatisfactory composition as far as its stability at reduced temperatures is concerned. Due to stearic acid's poor solubility and relatively high freezing point, the composition became solid at a temperature of 10° F. and separated upon thawing. At the same time the other compositions of the present invention upon thawing retained their clear, one-phase appearance. It should be noted, however, that before the compositions containing the stearic acid was subjected to freezing the appearance was satisfactory.

Examples 32 and 33 have, in addition to the normal components of the micellar dispersion of the present invention, small percentages of water added thereto. The small percentage of water acts to reduce the freezing point of the composition as described above.

The compositions of the present invention containing a high molecular weight unsaturated fatty acid have a storage stability in the range of 4 to 6 weeks. The stability may be increased to an indefinite period of time by the addition of between 2 to 5% of an alcohol, such as methanol, ethanol, isopropanol and the like which also act as freezing point dispersants as disclosed in our aforeidentified application Serial No. 39,444, now abandoned.

TABLE IX

|  | Ex. 35 | Ex. 36 | Ex. 37 | Ex. 38 |
|---|---|---|---|---|
| Composition, weight percent: |  |  |  |  |
| Udex raffinate [1] | 52.4 | 50.8 | 52.4 | 49.2 |
| Priminox R-1M [2] | 3.3 | 7.9 | 3.3 | 4.9 |
| Dinonylsalicylic acid | 11.5 |  |  |  |
| $C_{18}$ alkylated benzoic acid |  |  | 11.5 |  |
| Petroleum sulfonic acid (M.W. 450) |  | 9.5 |  |  |
| Hydrocarbon concentrate alkaryl sulfonic acid (M.W. 440) |  |  |  | 13.1 |
| Hydrazine | 32.8 | 31.8 | 32.8 | 32.8 |
| Heat of combustion, B.t.u./lb. (gross) | 16,100 | 15,890 | 16,100 | 16,000 |

[1] Udex raffinate is a low aromatic content naphtha fraction obtained as a raffinate in glycol extraction of a catalytic reformate.
[2] Priminox R-1M is tertiary $C_{12}$ to $C_{15}$ mixture of alkyl primary amine plus 1 mol of ethylene oxide.

Table X below gives the results of storage stability tests on selected examples of the foregoing compositions.

TABLE X

*Storage stability*

|  | No. of weeks stable |
|---|---|
| Composition #30 | 4 weeks. |
| Composition #37 | Storage stability excellent at the end of 30 weeks. |
| Composition #38 | Storage stability excellent at the end of 15 weeks. |
| Composition #39 | 10 weeks. |

| Compositions | #30 | #37 | #38 | #39 |
|---|---|---|---|---|
| Udex raffinate | 53.4 | 50.8 | 49.2 | 52.4 |
| Priminox R-1M | 3.3 | 7.9 | 4.9 | 3.3 |
| Oleic acid | 10.0 |  |  |  |
| Dinonylsalicylic acid |  |  |  | 11.5 |
| Petroleum sulfonic acid (M.W. 450) |  | 9.5 |  |  |
| Hydrocarbon concentrate alkaryl sulfonic acid (M.W. 450) |  |  | 13.1 |  |
| Hydrazine | 33.3 | 31.8 | 32.8 | 32.8 |

Obviously, many modifications and variations of the invention as hereinbefore set forth may be made without departing from the spirit and scope thereof and, therefore, only such limitations should be imposed as are indicated in the appended claims.

1. A transparent micellar dispersion composition comprising 30–99.5 weight percent liquid hydrocarbon phase, 0.5–70 weight percent hydrazine phase, said hydrazine phase being dispersed in the form of micelles having an average diameter less than 0.1 micron; the hydrocarbon component of said hydrocarbon phase being present, in an amount between 30 to 97 weight percent of said hydrocarbon phase; hydrazine being present in an amount of between 60–90 weight percent of said hydrazine phase; a hydrocarbon-soluble, hydrazine-insoluble dispersant having a general formula: $X(R'O)_nH$ wherein X is selected from the group consisting of an aliphatic alcohol, an alkyl phenol, an aliphatic hydrocarbyl amine containing 6 to 24 carbon atoms, R' is a divalent hydrocarbon radical containing from 2 to 4 carbon atoms and n has a value of 1 to 4, said hydrocarbon-soluble, hydrazine-insoluble dispersant being present in an amount of 3–70 weight percent of said hydrocarbon phase and a hydrazine-soluble, hydrocarbon-insoluble dispersant selected from the group consisting of hydrazine salts of aliphatic carboxylic acids of at least 4 carbon atoms and quaternary ammonium salts in an amount of 10–40 weight percent of said hydrazine phase.

2. A transparent micellar dispersion composition as described in claim 1 wherein said micelles have an average diameter less than 0.05 micron.

3. A transparent micellar dispersion composition as described in claim 1 wherein said hydrocarbon component of the hydrocarbon phase is selected from liquid hydrocarbons having a boiling point between 100 and 600° F.

4. A transparent micellar dispersion composition according to claim 1 wherein said hydrocarbon component of said hydrocarbon phase is a jet fuel composition.

5. A transparent micellar dispersion composition according to claim 1 in which said hydrocarbon-soluble, hydrazine-insoluble dispersant is represented by the formula:

$$X(R'O)_nH$$

wherein X is a residue selected from the group consisting of a $C_6$–$C_{24}$ aliphatic alcohol, a $C_6$ to $C_{24}$ aliphatic carboxylic acid, a $C_6$ to $C_{24}$ aliphatic hydrocarbyl amide, a $C_6$ to $C_{24}$ aliphatic hydrocarbon amine, and a $C_{10}$ to $C_{24}$ alkylphenol, R' is a divalent aliphatic hydrocarbon radical containing from 2 to 4 carbon atoms and n has a value of 1 to 6.

6. A transparent micellar dispersion composition according to claim 5 in which said hydrocarbon-soluble, hydrazine-insoluble dispersant is the reaction product of a $C_9$-alkylphenol and 2 mols of ethylene oxide.

7. A transparent micellar dispersion composition according to claim 5 in which said hydrocarbon-soluble, hydrazine-insoluble dispersant is the reaction product of a $C_{12}$-alkylphenol and 3 mols of ethylene oxide.

8. A transparent micellar dispersion composition according to claim 5 in which said hydrocarbon-soluble, hydrazine-insoluble dispersant is the reaction product of a t-($C_{13-15}$) alkyl primary amine and 1 mol of ethylene oxide.

9. A transparent micellar dispersion composition according to claim 5 in which said hydrocarbon-soluble, hydrazine-insoluble dispersant is the reaction product of nonylphenol and 4 mols of ethylene oxide.

10. A transparent micellar dispersion composition according to claim 1 in which said hydrazine-soluble, hydrocarbon-insoluble dispersant is selected from the group consisting of the hydrazine salts of (a) aliphatic carboxylic acids having 4 to 30 carbon atoms, (b) alkylated aromatic acids in which the alkyl group has 10 to 30 carbon atoms, (c) alkylated aromatic sulfonic acids in which the alkyl group has from 10 to 30 carbon atoms, (d) petroleum sulfonic acids having from 250 to 500 molecular weight, and (e) from the quaternary hydrocarbyl ammonium halides.

11. A transparent micellar dispersion composition according to claim 10 in which said hydrazine-soluble, hydrocarbon-insoluble dispersant is the hydrazine salt of oleic acid.

12. A transparent micellar dispersion composition according to claim 10 in which said hydrazine-soluble, hydrocarbon-insoluble dispersant is the hydrazine salt of linoleic acid.

13. A transparent micellar dispersion composition according to claim 10 in which said hydrazine-soluble, hydrocarbon-insoluble dispersant is the hydrazine salt of a highly branched $C_{18}$ chain liquid fatty acid.

14. A transparent micellar dispersion composition according to claim 10 in which said hydrazine-soluble, hydrocarbon-insoluble dispersant is the hydrazine salt of an alkylated benzoic acid wherein said alkyl group has 18 carbon atoms.

15. A transparent micellar dispersion composition according to claim 10 in which said hydrazine-soluble, hydrocarbon-insoluble dispersant is the hydrazine salt of an alkylated benzene sulfonic acid wherein said alkyl group has 20 carbon atoms.

16. A transparent micellar disperson composition according to claim 1 characterized by having a high specific impulse comprising 40 to 70 weight percent of said hydrocarbon phase, 30 to 60 weight percent of said hydrazine phase, 3 to 20 weight percent based on said hydrocarbon phase of a hydrocarbon-soluble, hydrazine-insoluble dispersant and 15 to 25 weight percent based on said hydrazine phase of a hydrazine-soluble, hydrocarbon-insoluble dispersant.

17. A transparent micellar dispersion composition according to claim 10 wherein said hydrazine salts are prepared in situ by the reaction of said acid with said hydrazine.

18. A transparent micellar disperson composition according to claim 1 containing 0.1 to 15 weight percent of a freezing point depressant selected from the group consisting of water, the $C_1$ to $C_3$ alcohols, acetonitrile, acetone, formamide and dimethyl formamide.

19. A transparent micellar dispersion composition according to claim 18 in which said freezing point depressant is water.

20. A transparent micellar dispersion composition according to claim 18 in which said freezing point depressant is methanol.

21. A transparent micellar dispersion composition according to claim 1 containing 5 to 30 weight percent of a viscosity depressant selected from the group consisting of $C_{4-18}$ aliphatic alcohol.

22. A transparent micellar dispersion composition according to claim 21 in which said viscosity depressant is 2-ethylbutanol.

References Cited by the Examiner

UNITED STATES PATENTS

| | | | |
|---|---|---|---|
| 1,811,552 | 6/51 | Mann | 44—56 |
| 2,646,348 | 7/51 | Neudeck | 44—56 |
| 2,573,471 | 10/51 | Malina et al. | 60—35.4 |
| 2,662,817 | 12/53 | Russell et al. | 60—35.4 X |
| 2,692,863 | 10/54 | Iler | 52—0.5 |
| 2,873,182 | 2/59 | Kosmin | 52—0.5 |
| 2,920,948 | 1/60 | Weeks | 52—0.5 |
| 2,934,417 | 4/60 | Schulze | 52—0.5 |
| 2,936,223 | 5/60 | Lovett et al. | 44—56 |

OTHER REFERENCES

The Oil and Gas Journal, Mar. 29, 1951, p 275, Rocket Propellant Handbook, by Kit et al., the Macmillan Co., 1960, pp. 101 and 102.

DANIEL E. WYMAN, *Primary Examiner.*